UNITED STATES PATENT OFFICE 1,990,807

PROCESS OF PRODUCING BENZANTHRONE CARBOXYLIC ACID

Viktor M. Weinmayr, Milwaukee, and John M. Tinker, South Milwaukee, Wis., assignors to E. I. du Pont de Nemours & Company, Wilmington, Del., a corporation of Delaware No Drawing. Application September 19, 1932, Serial No. 633,845

17 Claims. (Cl. 260—61)

This invention relates to the production of organic compounds. It is an object of our invention to provide a process for the production of benzanthrone-carboxylic acid. Other and further important objects of this invention will appear as the description proceeds.

We have found that Bzl-benzanthrone-carboxylic acid may be produced by reacting benzanthrone with carbon tetrachloride to give Bzl-trichloromethyl-benzanthrone, and then hydrolyzing this product to the corresponding carboxylic acid.

The reaction between benzanthrone and carbon tetrachloride may be effected by heating the two substances together in an excess of the tetrachloride and in the presence of metal halide condensing agents or catalysts. As condensing agents, anhydrous aluminum chloride, ferric chloride or zinc chloride may be used. As catalysts, copper, copper alloys, or copper compounds are suitable.

Under more drastic conditions, two benzanthrone molecules enter into reaction with each molecule of carbon tetrachloride. The product is then Bzl, Bzl' - dibenzanthronyl - dichloromethane, which may be hydrolyzed to give dibenzanthronyl-ketone. Such drastic conditions may include the use of excessive quantities of aluminum chloride, or the prolongation of the reaction until no further evolution of hydrochloric acid is observed.

Under milder conditions, however, for instance, by using not over 1 mol of aluminum chloride per mol of benzanthrone, or by the use of copper or a salt thereof as a catalyst, and in either case by stopping the reaction short of the period experimentally found necessary for complete reaction, considerable quantities of benzanthrone-trichloro-methane are formed.

Under such mild conditions the reaction does not go to completion. Considerable quantities of unchanged benzanthrone are left over, and on the other hand, substantial quantities of dibenzanthronyl-dichloro-methane are formed as a by-product. We have found, however, that by careful control of the conditions of the reaction, the latter may be directed toward the production of benzanthrone-carboxylic acid in sufficient yield to render the entire process of commercial interest.

These optimum conditions for the case where anhydrous aluminum chloride is used, appear to be the use of not over 1 mol of aluminum chloride per mol of benzanthrone; the heating at a temperature not exceeding 220° C., nor on the other hand falling much below 80° C., and the maintenance of the reaction at the elevated temperature for not over 3 to 4 hours.

Where a catalyst, such as copper, is used, the same temperature limits may be employed, but the time required for reaction is much longer, say 15 to 25 hours. The quantity of copper, on the other hand, is very much smaller than in the case of aluminum chloride, being as usual, of catalytic magnitude; that is, but a few per cent of the weight of benzanthrone used.

It is our belief that the entering carbon atom takes the position Bzl in the benzanthrone molecule.

Our invention therefore consists of a process for the manufacture of a mixture of benzanthrone compounds of the general formula:

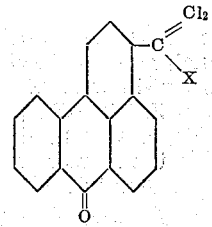

wherein X stands for a chlorine atom or a benzanthrone residue, and comprises further the features of first regulating the reaction so as to produce substantial yields of the monobenzanthrone compound, and secondly, converting the reaction products by hydrolysis into a mixture of compounds of the general formula:

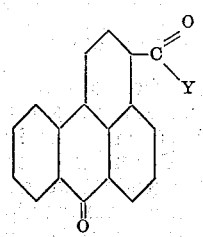

wherein Y stands for the OH radical or for a benzanthrone residue.

In the latter form the reaction products are readily separable from each other, as well as from any unreacted material. Thus, the alkali-metal salts of benzanthrone carboxylic acid are soluble in aqueous solution, while dibenzanthronyl-ketone and benzanthrone itself are insoluble. Hydrolysis of the reaction mass, therefore, by the aid of alkali, converts the same into a solution of an alkali-metal salt of benzanthrone carboxylic acid mixed with solid dibenzanthronyl-ketone and benzanthrone. The first compound may be separated from the other two by filtering, and recovered by acidifying the filtrate, whereby the free acid precipitates. From the residual mass the benzanthrone may be extracted by the aid of toluene, leaving behind the solid dibenzanthronyl-ketone.

Without limiting our invention to any particular procedure, the following examples in which parts by weight are given will serve to illustrate our preferred mode of operation. Parts given are by weight.

Example 1

3000 parts of carbon tetrachloride, 460 parts of benzanthrone and 146 parts of anhydrous aluminum chloride are charged into an autoclave, and heated slowly to 180° C. The mass is maintained at 180–185° C. for 3 hours. During this period, hydrochloric acid is evolved, and the pressure continually rises. The mass is now cooled and the pressure released, preferably by absorbing the hydrochloric acid in water. The mass is then discharged into 6000 parts of cold water and stirred for several hours to decompose the intermediate organic-aluminum chloride complex compound. The resulting suspension is filtered and washed with water. The excess carbon tetrachloride may be recovered from the filtrate.

The light brown filter-cake is suspended in 6000 parts of water, rendered alkaline with caustic soda, and heated to 95–100° C. for several hours. The mass is now filtered, and the filtrate is acidified to precipitate Bzl-benzanthrone-carboxylic acid. The latter is filtered off and washed acid free.

The filter cake from the alkaline extraction mass contains unchanged benzanthrone and Bzl, Bzl'-dibenzanthronyl-ketone. To separate these, the filter cake is boiled in 3000 parts of toluene, cooled and filtered. The benzanthrone is extracted and passes into the filtrate, while the ketone is insoluble and remains in the filter cake.

Example 2

3000 parts of carbon tetrachloride, 460 parts of benzanthrone, 133 parts of anhydrous aluminum chloride and 27 parts of sodium chloride are heated in a closed vessel to 145–150° C. for about 4 hours. The mass is worked up as in Example 1 and separated into Bzl-benzanthrone-carboxylic acid, benzanthrone, and dibenzanthronyl-ketone.

Example 3

2000 parts of carbon tetrachloride, 150 parts of benzanthrone, and 44 parts of anhydrous aluminum chloride are refluxed in a suitable vessel for 24 hours. The mass is then charged into water and further worked up as in Example 1, to yield benzanthrone-carboxylic acid, benzanthrone and dibenzanthronyl-ketone.

Example 4

3000 parts of carbon tetrachloride, 460 parts of benzanthrone, and 4 parts of copper-bronze (metallic copper in an exceedingly finely divided form) are heated in an autoclave to 160–165° C., for about 18 hours. The mass is cooled, the pressure is released, and the hydrochloric acid formed is absorbed in water. The mass is then discharged into water and filtered. The filter cake is suspended in water, rendered alkaline, and further treated as in Example 1, to recover Bzl-benzanthrone-carboxylic acid.

Many variations are possible in our preferred procedure above indicated without departing from the spirit of this invention. For instance, the amount of carbon tetrachloride employed may be varied within wide limits. It will be noted that in addition to providing 1 mol of carbon tetrachloride for reaction with each mol of benzanthrone, we use an excess of the former to serve as a suspending medium for the entire mixture. Consequently, the minimum quantity of carbon tetrachloride employed is that which will effect a thin, easily stirring suspension of the benzanthrone, as well as the inorganic constituents of the mixture. Beyond this, any quantity of carbon tetrachloride may be used.

Instead of aluminum chloride, ferric chloride or zinc chloride may be used. Instead of copper-bronze, copper powder or copper compounds may be used.

The amount of aluminum chloride employed may be varied within reasonable limits. However, with increased quantities of aluminum chloride, the proportion of dibenzanthronyl-dichloro-methane formed in the reaction mass increases. It is therefore safer to keep the aluminum chloride-benzanthrone ratio below 1:1. A ratio of ½ mol AlCl₃ to 1 mol of benzanthrone appears to give the best results.

The reaction may take place at higher or lower temperatures, as already indicated. Nor is pressure essential to the reaction, except in so far as it enables the use of higher temperatures, thereby increasing the rate of reaction.

Sodium or potassium chloride may be added to the aluminum chloride to facilitate its melting at a lower temperature.

Although it is preferable to effect the hydrolysis by the aid of an alkali in view of the resulting incidental separation of the benzanthrone carboxylic acid from the reaction mass, hydrolysis may nevertheless be effected by the aid of an acid, say dilute hydrochloric acid. In this case, however, the benzanthrone carboxylic acid precipitates, together with the dibenzanthronyl-ketone, and further steps to separate these are requisite.

Many other variations and modifications are possible within the scope of our invention, without departing from the spirit thereof as defined by the subjoined claims.

It should be further understood that while we referred to the compounds produced as Bzl or Bzl, Bzl', thereby expressing our belief as to the most probable position of the entering carbon atom, our invention does not depend on any particular theory for operativeness. The following claims should therefore be construed as covering the process herein described, regardless whether the resultant products are truly Bzl compounds or isomers thereof.

We claim:

1. A process for producing benzanthrone-carboxylic acid which comprises heating benzanthrone with carbon tetrachloride to reaction temperatures and under conditions leading to their condensation, said conditions being milder than those favoring the production of dibenzanthronyl-dichloro-methane, and hydrolyzing the reaction product.

2. A process for producing benzanthrone-carboxylic acid which comprises heating benzanthrone with carbon tetrachloride to reaction temperatures and under conditions leading to their condensation, said conditions being milder than those favoring the production of dibenzanthronyl-dichloro-methane, hydrolyzing the reaction product by the aid of caustic alkali, and separating the alkali-metal salt of benzanthrone-carboxylic acid from the by-products of the reaction.

3. A process for producing Bzl-benzanthrone-carboxylic acid which comprises reacting benzanthrone with carbon tetrachloride in the presence of a condensing agent for a period of time shorter than that required for complete reaction, whereby to produce a mixture of compounds represented by the general formula:

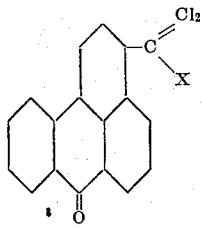

wherein X stands for a chlorine atom or for a benzanthrone radical, hydrolyzing the reaction mass by the aid of aqueous caustic alkali to produce a mixture of compounds represented by the general formula:

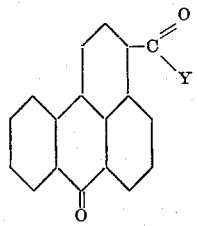

wherein Y stands for the OH radical or for a benzanthrone radical, and separating the aqueous solution of the alkali-metal salt of benzanthrone carboxylic acid from the residual, water-insoluble mass.

4. A process for producing benzanthrone-carboxylic acid which comprises heating benzanthrone with carbon tetrachloride in the presence of a metal halide condensing agent to reaction temperatures and under conditions leading to their condensation, said conditions being milder than those favoring the production of dibenzanthronyl-dichloromethane, and hydrolyzing the reaction product.

5. A process for producing benzanthrone-carboxylic acid which comprises reacting benzanthrone with carbon tetrachloride in the presence of a copper catalyst, dicontinuing the reaction before complete conversion into dibenzanthronyl-dichloromethane has taken place, and hydrolyzing the reaction product.

6. A process for producing benzanthrone-carboxylic acid which comprises heating benzanthrone with carbon tetrachloride in the presence of anhydrous aluminum chloride to reaction temperatures and under conditions leading to their condensation, said conditions being milder than those favoring the production of dibenzanthronyl-dichloromethane, and hydrolyzing the reaction mass.

7. A process for producing benzanthrone-carboxylic acid which comprises reacting benzanthrone with carbon tetrachloride in the presence of copper-bronze discontinuing the reaction before complete conversion into dibenzanthronyl-dichloromethane has taken place, and hydrolyzing the reaction mass.

8. A process for producing benzanthrone-carboxylic acid which comprises reacting 1 mol of benzanthrone with an excess of carbon tetrachloride in the presence of not more than 1 mol of anhydrous aluminum chloride, discontinuing the reaction before complete conversion into dibenzanthronyl-dichloromethane has taken place, hydrolyzing the reaction product, and recovering Bzl-benzanthrone-carboxylic acid.

9. A process for producing benzanthrone-carboxylic acid which comprises suspending benzanthrone in an excess of carbon tetracholoride and in the presence of not over 1 mol of anhydrous aluminum chloride, heating the mass to a temperature between 80 and 220° C., discharging the reaction mass into water, separating from the excess of carbon tetrachloride, adding sufficient caustic alkali to render the mass alkaline, and separating the alkali-metal salt of benzanthrone-carboxylic acid.

10. A process for producing benzanthrone-carboxylic acid which comprises suspending benzanthrone in an excess of carbon tetrachloride and in the presence of substantially ½ mol of anhydrous aluminum chloride, heating the mass to a temperature of about 145 to 180° C., and for a period not exceeding 4 hours, discharging the reaction mass into water, separating from the excess of carbon tetrachloride, adding sufficient caustic alkali to render the mass alkaline, and separating the alkali-metal salt of benzanthrone-carboxylic acid.

11. A process for producing benzanthrone-carboxylic acid which comprises suspending benzanthrone in an excess of carbon tetrachloride and in the presence of a small quantity of copper body, heating the mass to a temperature of 160 to 165° C. for a period of about 18 hours, discharging the reaction mass into water, separating from the excess of carbon tetrachloride, adding sufficient caustic alkali to render the mass alkaline, and separating the alkali-metal salt of benzanthrone-carboxylic acid.

12. In the process of manufacturing Bzl-benzanthrone-carboxylic acid by reacting benzanthrone with carbon tetrachloride to produce a mixture of benzanthrone, benzanthrone-trichloro-methane and dibenzanthronyl-dichloro-methane, the steps which comprise neutralizing the reaction mixture with aqueous caustic soda, and filtering off a solution of the sodium salt of Bzl-benzanthrone-carboxylic acid.

13. In the process of manufacturing Bzl-benzanthrone-carboxylic acid by reacting benzanthrone with carbon tetrachloride to produce a mixture of benzanthrone, benzanthrone-trichloro-methane, and dibenzanthronyl-dichloro-methane, the steps which comprise neutralizing the reaction mixture with aqueous caustic soda, filtering off a solution of the sodium salt of Bzl-benzanthrone-carboxylic acid, and acidifying the filtrate to precipitate Bzl-benzanthrone-carboxylic acid.

14. In the process of manufacturing Bzl-benzanthrone-carboxylic acid, the step which comprises reacting benzanthrone with carbon tetrachloride in the presence of aluminum chloride for a period of time shorter than that required for complete reaction, whereby to produce a mixture of benzanthrone, benzanthrone-trichloromethane, and dibenzanthronyl-dichloro-methane.

15. The process which comprises heating a solution of benzanthrone in carbon tetrachloride in the presence of not over 1 mol of anhydrous aluminum chloride as compared to the weight of the benzanthrone, at a temperature between 80 and 220° C., for a length of time less than that required for complete conversion of the benzanthrone into dibenzanthronyl-dichloro-methane.

16. The process which comprises heating a solution of benzanthrone in carbon tetrachloride in the presence of about ½ mol of anhydrous aluminum chloride as compared to the weight of benzanthrone, at a temperature of 145° to 180° C., for a period not exceeding 4 hours.

17. The process which comprises heating a solution of benzanthrone in carbon tetrachloride in the presence of a copper catalyst at a temperature of about 160–165° C. and for a period of about 18 hours.

VIKTOR M. WEINMAYR.
JOHN M. TINKER.